United States Patent [19]

McCarthy

[11] Patent Number: 4,968,547

[45] Date of Patent: Nov. 6, 1990

[54] MULTI-PIECE SHIPPING LABEL

[76] Inventor: Hubert McCarthy, 4420 75th Avenue, S.E., Calgary, Alberta, Canada, T2C 2H8

[21] Appl. No.: 193,037

[22] Filed: May 12, 1988

[51] Int. Cl.[5] .......................... B32B 7/06; B32B 7/14

[52] U.S. Cl. .......................................... 428/42; 428/40; 428/194; 428/202

[58] Field of Search ..................... 428/40, 41, 42, 202, 428/194; 40/299, 638; 283/81

[56] References Cited

FOREIGN PATENT DOCUMENTS 3127626 1/1983 Fed. Rep. of Germany ........ 428/40

*Primary Examiner*—Alexander S. Thomas

*Attorney, Agent, or Firm*—Shlesinger & Myers

[57] ABSTRACT

One form of conventional shipping unit includes a plurality of forms interconnected at their ends by tabs for bearing information concerning, inter alia, the shipper and consignee. Most of the forms are carried by a sleeve or envelope, which has an adhesive backing for connecting the envelope to a package to be shipped. When a plurality of packages are to be shipped in a single shipment, it is necessary to prepare a plurality of forms, to provide a separate sheet of labels bearing the same information, e.g. bar codes or numerals, or to label each of the packages with a pen, marker or stamp. It has been found that part of the removable cover for the rear or bottom adhesive bearing surface of the envelope can be used for labelling purposes, i.e. can provide labels bearing the same identifying indicia for a plurality of packages being shipped with a single set of forms. This is achieved by providing adhesive on the periphery of the bottom surface of the envelope and on the top surface of the labels, which define the central area of the cover. The remaining areas of the bottom surface of the envelope and of the top surface of the cover are coated with a release agent. Thus, the labels can be removed from the cover for use on a plurality of packages, and the periphery of the bottom surface of the envelope can be adhered to one package. The cover for the adhesive surface of the envelope has until now been considered to be waste.

5 Claims, 3 Drawing Sheets

MULTI-PIECE SHIPPING LABEL

BACKGROUND OF THE INVENTION

This invention relates to a shipping label, and more specifically to a multi-piece shipping label.

While the invention was specifically designed for use on multi-section or panel shipping form units of the type commonly used by courier firms, it will be appreciated that the invention can and will find other uses.

In general, shipping form units of the type mentioned above are formed of layers of information sheets between which sheets of carbon paper are sandwiched, so that the same information concerning the shipper or sender and consignee or ultimate recipient of the package appears on all information sheets. The ends of the information sheets are sealed together, and separated from the remainder of the sheets by lines of perforations, so that such sheet ends define tabs permitting removal of one or more sheets from the remainder of the unit. Tabs are usually provided at both ends of the unit. Moreover, the unit includes an envelope for carrying selected sheets of the form units. The rear or bottom surface of the unit is defined by a removable cover, which is attached to a layer of adhesive on the outer surface of the bottom or back ply of the envelope. When a package is picked up by a courier, the shipping unit as completed by the shipper is handed to the courier, who completes the form, removes the back cover, and presses the unit against the package to attach the unit thereto. Of course, the top or shipper's copy of the form is removed and left with the shipper. The courier removes additional billing and accounting information sheets so that the only remaining sheets are a package sheet, i.e. a sheet which stays with the package and a receipt for signing by the recipient or consignee.

When shipping a single package only, a shipping unit of the above described type is more than adequate However, when a shipper wishes to send a single shipment of more than one package to a single consignee, a problem arises In order to ensure that all packages of the single shipment reach the consignee, a set of labels each bearing the same numbers, bar code or other indicia must be provided for attachment to the packages One solution to the problem is to attach a separate sheet of labels to a shipping unit of the type described above. The result is a thicker, more complicated and more expensive product, which adds complications to the manufacturing process.

The object of the present invention is to overcome the problem identified above by providing a relatively simple shipping label, which can be incorporated in a single or continuous form-type shipping unit without adding a layer to the unit, and which utilizes what could be considered as waste space or material of the unit.

BRIEF SUMMARY OF THE INVENTION

Accordingly, the present invention relates to a shipping label comprising first ply means; second ply means substantially coextensive with said first ply means; a first layer of adhesive on a selected area of said first ply means releasably connecting a corresponding area of said second ply means to said first ply means and adapted to connect said first ply means to an article to be shipped; label means defining a separable portion of said second ply means; and a second adhesive layer on said label means releasably connecting said label means to an area of said first ply means separate from said selected area.

BRIEF DESCRIPTION OF THE DRAWINGS

The invention will be described in greater detail with reference to the accompanying drawings, which illustrate, inter alia, a preferred embodiment of the invention, and wherein.

The terms "front" and "back" are used to define the surfaces of the unit, sheets, layer or ply which are the top and bottom surfaces, respectively when the element in question is in the normal position for completion or signing.

Figure 1:
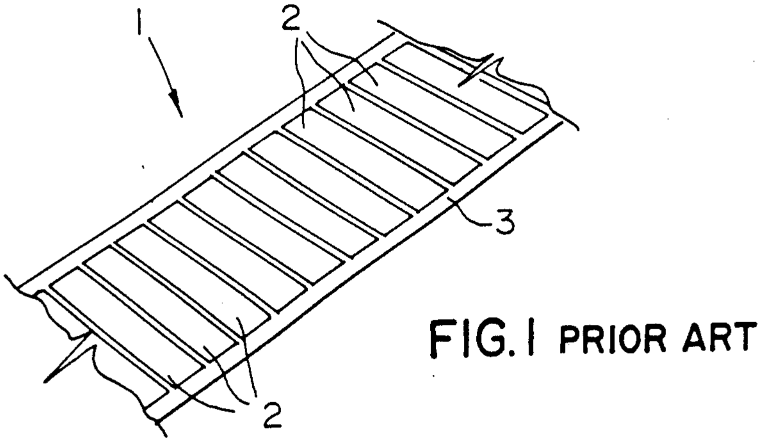
FIG. 1 PRIOR ART
FIG. 1 is a perspective view of a section of a sheet of commercially available labels.
Figure 2:
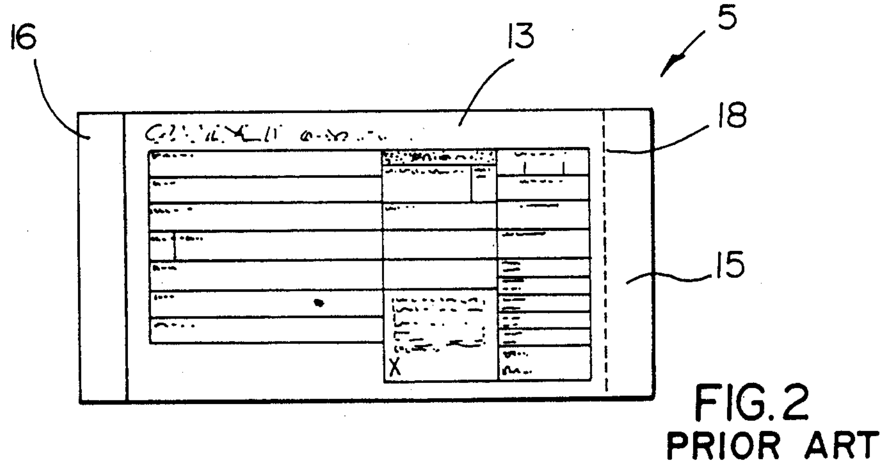
FIG. 2 PRIOR ART
FIG. 2 is a plan view of a conventional shipping form unit of the type currently in use.
Figure 3:
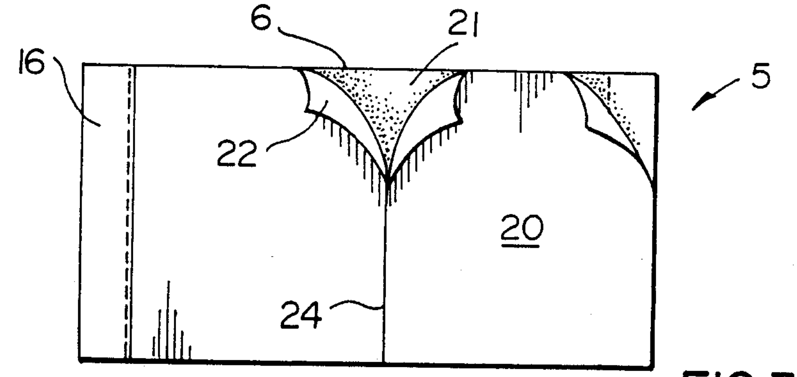
FIG. 3 PRIOR ART
FIG. 3 is a rear view of the unit of FIG. 2.
Figure 4:
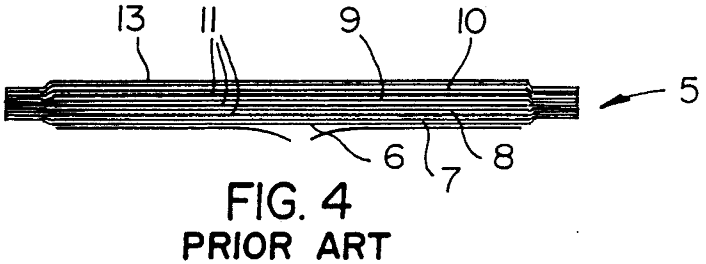
FIG. 4 PRIOR ART
FIG. 4 is a bottom view of the unit of FIG. 3.
Figure 5:
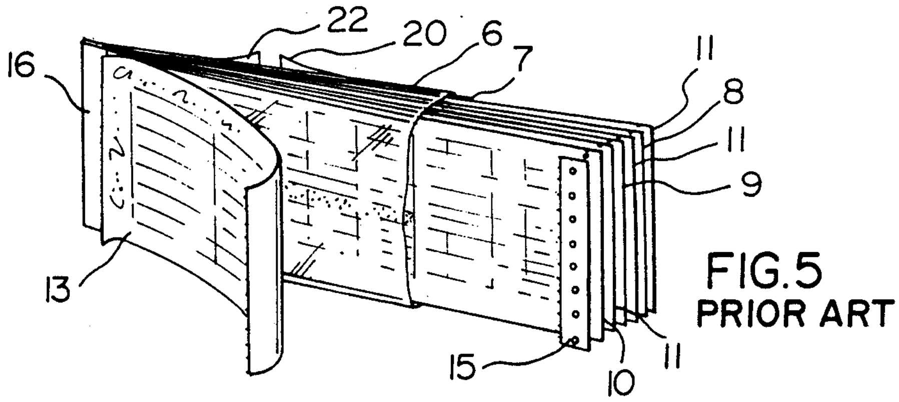
FIG. 5 PRIOR ART
FIG. 5 is a schematic, partly exploded, perspective view of the unit of FIGS. 2 to 4.

Referring to FIG. 1, a conventional sheet of labels generally indicated at 1 includes a plurality of individual labels 2 removably mounted on a backing or carrier sheet 3. The sheet of labels 1 is produced by printing a plurality of labels on an elongated strip of paper with a layer of pressure sensitive adhesive on the bottom surface of the paper, and a backing sheet 3, which was previously coated with a release agent such as silicone. After printing, die cutting of the label sheet only is effected and the border around the individual labels 2 is removed leaving the separate labels on the backing sheet 3.

The same production method is used in the manufacture of shipping form units generally indicated at 5 (FIGS. 2 to 5). Each unit 5, which can be produced in single or continuous form, defines a so-called snap set including a protective envelope 6 (FIG. 5), which contains a plurality of information sheets 7, 8, 9 and 10, which are separated by sheets of carbon paper 11 (FIG. 4), and a top information sheet 13, which is outside of the envelope. The ends of the information sheets define tabs 15 and 16. The tab 15 at one end is completely outside of the envelope 6. For such purpose the envelope 6 is a thin sleeve or tube, which is sealed at one end. The lowermost information sheet 7 is a delivery receipt, which remains with the consignee. The other receipts 8 and 9 in the envelope 6 are for billing and accounting purposes, and the sheet 10 is a package sheet immediately beneath the top ply of the envelope 6 for transferring information, which remains permanently in the envelope 6 to the subjacent sheets 8 and 9. The uppermost sheet 13 is the shipper's receipt, which is completed by the shipper and by the courier. When the sheet 13 is being completed, i.e. addressed, etc., the carbon paper 11 transfers the information to all of the underlying information sheets 7, 8 and 9. The uppermost sheet of carbon paper 11 is double sided, i.e. has carbon on both sides, so that the information is transferred by the single sheet of carbon paper to the flimsy sheets 9 and 10. The sheet 10 is transparent so that writing on the rear or bottom surface thereof is clearly visible through the top ply of the envelope 6.

The uppermost information sheet 13 is connected to one tab 15 only by a line of perforations 18, so that the sheet 13 can readily be removed on the premises of the shipper. The sheets 8 and 9 are firmly connected to the tab 15 as is one end of each sheet 11 of carbon paper. The other ends of the sheets 8 and 9 are connected to the tab 16 by lines of perforations, but the same ends of the carbon paper 11 are loose or separate from the remainder of the unit. Following removal of the shipper's information sheet 13, the tab 15 is grasped firmly by the courier between the thumb and index finger, and pulled to remove all of the carbon paper sheets 11, and the information sheets 8 and 10. The consignee's or delivery receipt 7 remains in the envelope 6 with the package sheet 10. The carbon paper 11 is discarded and the sheets 8 and 9 are retained by the courier. A protective liner or cover 20 is then removed from the rear surface 21 of the bottom or rear layer of the envelope 6. A pressure sensitive adhesive is present on such rear surface 21, and the top surface 22 of the cover 20 is treated with a release agent (not shown) such as silicone, so that the cover 20 can readily be removed therefrom. The cover 20 includes a central slit 24 to facilitate removal thereof. When the cover 20 is removed, the envelope containing the remaining sheets 7 and 10 of the forms is pressed onto the package for shipping therewith. Upon reaching its destination, the lowermost form 7 (the delivery receipt) is grasped at the end opposite to the tab 16, removed by the courier and signed by the consignee as proof of delivery. The copy 10 remains in the envelope with the package Of course, this is but one variation, others being adapted to the particular needs and desires of the courier service industry.

The above described structure already exists and represents prior art. A unit of this type is described in applicant's Canadian Patent No. 1,116,137, which issued on Jan. 12, 1982. While the unit is more than adequate for most single package shipping requirements, it does not meet the demands of multi-package shipments of the type in which a plurality of packages are shipped together to a single consignee. In such cases, separate shipping units can be prepared, or alternatively a separate sheet (not shown) of labels is attached to each shipping unit. The labels have pressure sensitive adhesive on the bottom surface thereof and are mounted on a separate backing sheet or cover treated with a release material. Either method of labelling separate packages of a single shipment is expensive and/or time consuming, increases the likelihood of transcription errors in numbering, and presents difficulties when matching bar code consecutive numbering (to conform to shipping unit number).

Figure 6:
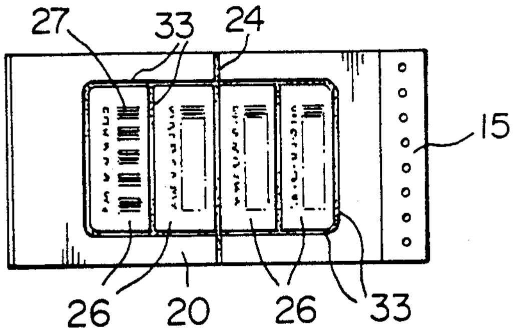
FIG. 6 is a schematic rear view of the unit of FIGS. 2 to 5 modified in accordance with the present invention.
Figure 7:
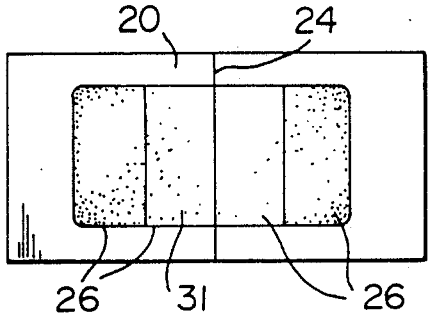
FIG. 7 is a front view of the back cover sheet of FIG. 6.
Figure 8:
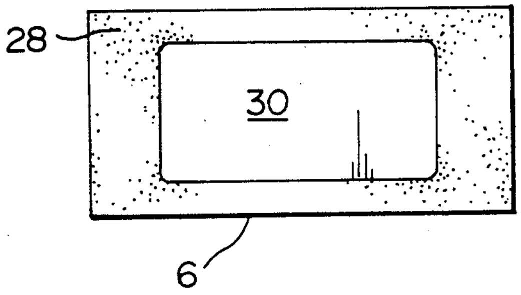
FIG. 8 is a back view of an envelope which normally carries the cover sheet of FIGS. 6 and 7.

With reference to FIGS. 6 to 8, the solution offered by the present invention utilizes the rear cover 20 on the envelope 6, i.e. uses something which could be considered to be waste. Simply stated, a shipping label 26 in accordance with the present invention is a section of the cover 20. A plurality of such labels 26 are provided on each cover 20 for attachment to a plurality of packages of a single shipment. The labels 26 are defined by a strip of plastic (the cover material), bearing indicia 27, i.e. identifying information such as numerals and/or bar codes identical to indicia found on the information sheets 7, 8, 9, 10 and 13 of the shipping unit, so that the labels 26 can be attached to packages to identify them as part of a single shipment.

It will be appreciated that the bottom or rear surface of the shipping unit envelope 6 need not be completely coated with pressure sensitive adhesive in order to function in the desired manner. A layer of adhesive 28 completely covering the periphery only (FIG. 8) of the rear surface of the envelope 6 will suffice. Thus, the central area 30 of such rear surface can be coated with a release agent for releasably carrying the cover 20 and the labels 26.

When producing the cover 20, the central, label area of the top surface thereof is coated with adhesive 31 (FIG. 7), and the periphery of such top surface is coated with a release agent. The cover 20 is then placed on the rear surface of the envelope 6, and, as in the production of the sheet of labels (FIG. 1), die cutting of the sheet is effected to cut the slit 24 and slits 33, whereby a plurality of separate labels 26 are formed in the cover. Of course, the labels 26 are left in position on the envelope 6 until they are required for attachment to separate packages of a single shipment. In FIG. 6, the width of the slits 24 and 33 is exaggerated to facilitate illustration. However, the slits are narrow as in FIG. 7.

In actual production, the bottom or rear surface of the envelope 6 is selectively coated (in the central area) with silicone. When the top surface of the cover is selectively coated (in the area of the periphery only), the cover is coated with adhesive, and the cover is placed on the envelope 6, so that the adhesive is sandwiched between the envelope and cover. Indicia 27 is applied to the bottom surface of the cover, and the slits 24 and 33 are cut to form the separate labels 26.

The foregoing includes a description of the production of one set of labels 26. The labels and shipping units 5 can be mass produced using conventional continuous form production techniques. A base stock of paper or polyethylene is first treated with a release agent such as silicone in central areas 30 (FIG. 8). For such purpose selected areas of the base stock are masked while the release agent is applied. The same method is used to provide a release agent coated area on the top surface of the paper or polyethylene stock used to produce the covers 20. Adhesive is then applied to the top surface of the covers 20, and the latter are applied to the envelopes 6 so that the adhesive is sandwiched between the envelopes and covers. Bar code and/or other indicia are printed onto the covers 20, and the separate labels 26 and the slits 24 and 33 are produced by die cutting.

Regardless of whether the labels 26 are removed from the cover 20 for use on separate packages, the rear surface of the envelope 6 can be attached to a package after the periphery of the cover 20 has been removed therefrom. As mentioned, the adhesive on the periphery only is sufficient for shipping purposes. Of course, the cover 20 can be a one piece unit, i.e. lacking a central slit 24.

Thus, there has been described a relatively simple solution to the problem of labelling the various packages of a single multi-package shipment.

While the description has been limited to a shipping unit, it will be appreciated that labels can be used on the rear or bottom surface of a conventional polyethylene envelope, i.e. the envelope need not form part of a snap set or shipping unit.

What is claimed:

1. A shipping label comprising:

(a) a sheet having a rear surface, (b) said rear surface having adhesive means covering the periphery thereof, (c) said rear surface including a central area coated by a release agent, (d) a cover means having a central area coated with adhesive means and a periphery coated with a release agent, (e) said cover means being releasably attachable to said rear surface so that the periphery of said rear surface releasably engages the periphery of said cover means, and (f) the central portion of said cover means releasably engages the central portion of said rear surface.

2. The shipping label of claim 1, wherein:

(a) said cover means includes separable portions, and (b) said cover means includes a cut extending around said adhesively coated central area between said periphery and said adhesively coated central area.

3. The shipping label of claim 2, wherein:

(a) said adhesively coated central area having cuts therein dividing said central area into a plurality of sections, and (b) each of said sections being selectively removable from said rear surface and from each other.

4. The shipping label of claim 3, wherein:

(a) said sections include adhesive means thereon for affixing said sections to a mailable item.

5. The shipping label of claim 2, wherein:

(a) said cover includes a slit extending across said cover and dividing said cover into two sections, and (b) said slit divides the periphery of said cover into two U-shaped sections.

* * * * *